(12) United States Patent
Ayalon et al.

(10) Patent No.: US 12,272,041 B1
(45) Date of Patent: Apr. 8, 2025

(54) SYSTEMS AND METHODS FOR STATISTICS-BASED DEFECT PIXEL DETECTION

(71) Applicant: TriEye Ltd., Tel Aviv (IL)

(72) Inventors: Elad Ayalon, Tel Aviv (IL); Avraham Bakal, Tel Aviv (IL); Uriel Levy, Tel Aviv (IL); Omer Kapach, Tel Aviv (IL)

(73) Assignee: TriEye Ltd., Tel Aviv (IL)

( * ) Notice: Subject to any disclaimer, the term of this patent is extended or adjusted under 35 U.S.C. 154(b) by 0 days.

(21) Appl. No.: 18/427,851

(22) Filed: Jan. 31, 2024

(51) Int. Cl.
*G06T 7/00* (2017.01)
*G06T 5/77* (2024.01)
*G06T 7/13* (2017.01)
*H04N 25/683* (2023.01)

(52) U.S. Cl.
CPC .............. *G06T 7/0002* (2013.01); *G06T 5/77* (2024.01); *G06T 7/13* (2017.01); *H04N 25/683* (2023.01); *G06T 2207/10048* (2013.01)

(58) Field of Classification Search
CPC ...... H04N 25/683; H04N 25/60; H04N 25/63; H04N 25/67; G06T 7/0002–001; G06T 2207/30168; G06T 5/00; G06T 5/70; G06T 5/77; G06T 5/60; G06T 7/13
See application file for complete search history.

(56) References Cited

U.S. PATENT DOCUMENTS

| | | | | |
|---|---|---|---|---|
| 2002/0196354 A1* | 12/2002 | Chang | .................. | H04N 25/683 348/E5.081 |
| 2010/0026862 A1* | 2/2010 | Nishiwaki | ............ | H04N 25/683 348/246 |
| 2012/0133804 A1* | 5/2012 | Kim | ..................... | H04N 25/683 348/E9.042 |
| 2014/0192236 A1* | 7/2014 | Kolli | ...................... | H04N 25/60 348/246 |

OTHER PUBLICATIONS

Wang, Wenjie, et al. "Noise suppression algorithm of short-wave infrared star image for daytime star sensor." Infrared Physics & Technology 85 (2017): 382-394. (Year: 2017).*
Ghosh, Siddhartha, Dirk Froebrich, and Alex Freitas. "Robust autonomous detection of the defective pixels in detectors using a probabilistic technique." Applied optics 47.36 (2008): 6904-6924. (Year: 2008).*
Tchendjou, Ghislain Takam, and Emmanuel Simeu. "Detection, location and concealment of defective pixels in image sensors." IEEE Transactions on Emerging Topics in Computing 9.2 (2020): 664-679. (Year: 2020).*
Novel Peer Group Filtering Method Based on the CIELab Color Space For Impulse Noise Reduction, Yu-Ren Laia, Kuo-Liang Chunga, Wei-Ning Yangb, Chyou-Hwa Chena, and Le-Chung Lina.

* cited by examiner

*Primary Examiner* — Geoffrey E Summers
(74) *Attorney, Agent, or Firm* — Nathan & Associates; Menachem Nathan (57) ABSTRACT

Described herein are systems and methods for on-the-fly detection of a defective pixel in an image that may include: receiving the image; for each analyzed pixel in the image, selecting an analyzed cell, wherein the analyzed cell includes a plurality of pixels; performing statistical distribution analysis for the plurality of pixels in the analyzed cell; determining an allowed statistical distance for the analyzed pixel relative to the analyzed cell; and determining that the analyzed pixel is a defective pixel if a computed statistical distance of the analyzed pixel exceeds the allowed statistical distance.

19 Claims, 9 Drawing Sheets

SYSTEMS AND METHODS FOR STATISTICS-BASED DEFECT PIXEL DETECTION

FIELD

Subject matter disclosed herein relates to use of statistical methods for detection of defective pixels in an image array.

BACKGROUND

Digital images are formed from an array of pixels, each pixel having an assigned color and intensity. The digital image may be captured by a sensor having an array of photodetectors where each photodetector is located at a respective pixel position. The digital image may include defective pixels which are a result of defective photodetectors that produce imperfections in the corresponding pixel locations. Detection of defective pixels in an image array is crucial for improving the image quality but may be difficult. For example, in some cases, defective pixels may be incorrectly categorized as "noisy pixels" from random impulse noise or as "salt and pepper noise" (SPN). Further, in some cases, defective pixels are not necessarily at the edges of the image intensity range and thus may not "stand out". In addition, it may not be possible to mark pixels in a physical array as defective using preliminary calibration methods. Yet further, pixels may be momentarily defective and permanently marking these pixels as defective may be counterproductive.

The SPN phenomenon may be dealt with by applying filtering across the image without first identifying defective pixels, such that functional as well as defective pixels are adjusted resulting in potentially unwanted smoothing out of textures or removal of features in the image. Alternatively, peer group filtering methods may be used but these are typically computationally expensive requiring multiple stages of calculation and use of histograms. However, none of the known methods suggest an "on-the-fly" solution for detecting outlier pixels or defective pixels.

SUMMARY

Consistent with disclosed embodiments, a method for on-the-fly detection of a defective pixel in an image may include: receiving the image; for each analyzed pixel in the image, selecting an analyzed cell, wherein the analyzed cell includes a plurality of pixels; performing statistical distribution analysis for the plurality of pixels in the analyzed cell; determining an allowed statistical distance for the analyzed pixel relative to the analyzed cell; and determining that the analyzed pixel is a defective pixel if a computed statistical distance of the analyzed pixel exceeds the allowed statistical distance.

In some embodiments, the allowed statistical distance is a maximum value between an allowed statistical deviation and a predefined minimum distance. In some embodiments, the computed statistical distance indicates the intensity level of the analyzed pixel in comparison to a statistical center of the intensity levels of the plurality of pixels included in the analyzed cell. In some embodiments, the statistical distribution analysis includes calculating at least one of a mean value, a median value, or a standard deviation value based on the intensity levels of pixels included in the analyzed cell.

In some embodiments, the selecting an analyzed cell is based on predefined analysis parameters. In some embodiments, the predefined analysis parameters are one or more parameters from the group consisting of: a shape of the analyzed cell, a size of the analyzed cell, inclusion of the analyzed pixel in the analyzed cell, a result of a directional analysis in the analyzed cell. In some embodiments, the analyzed cell includes the analyzed pixel.

In some embodiments, a shape of the analyzed cell is selected from the group consisting of a square of pixels, a rectangle of pixels, a cross-shape of pixels, a semicircular line of pixels, or a line of pixels. In some embodiments, the allowed statistical distance is based on statistical calculation parameters. In some embodiments, the statistical calculation parameters are selected from the group consisting of a type of statistical distribution analysis, a type of mean function, a type of standard deviation, a minimal value for an allowed statistical deviation of the analyzed pixel, and the allowed statistical deviation expressed in a number of SDs from an SD analysis of the analyzed cell, a distance threshold, and one or more predefined multipliers.

In some embodiments, the method may further include identifying of sharp edge transitions in the analyzed cell. In some embodiments, the method may further include detecting and removing an outlier pixel in the analyzed cell.

Consistent with disclosed embodiments, a system for on-the-fly detection of a defective pixel in an image may include: an imaging sensor; and a computer system including a hardware processor configurable to perform a method, the method including: receiving the image from the imaging sensor; for each analyzed pixel in the image, selecting an analyzed cell, wherein the analyzed cell includes a plurality of pixels; performing statistical distribution analysis for the plurality of pixels in the analyzed cell; determining an allowed statistical distance for the analyzed pixel relative to the analyzed cell; and determining that the analyzed pixel is a defective pixel if a computed statistical distance of the analyzed pixel exceeds the allowed statistical distance.

In some embodiments, the allowed statistical distance is a maximum value between an allowed statistical deviation and a predefined minimum distance. In some embodiments, the computed statistical distance indicates the intensity level of the analyzed pixel in comparison to a statistical center of the intensity levels of the plurality of pixels included in the analyzed cell.

In some embodiments, the statistical distribution analysis includes calculating at least one of a mean value, a median value, or a standard deviation value based on the intensity levels of pixels included in the analyzed cell. In some embodiments, the selecting an analyzed cell is based on predefined analysis parameters.

In some embodiments, the predefined analysis parameters are one or more parameters from the group consisting of: a shape of the analyzed cell, a size of the analyzed cell, inclusion of the analyzed pixel in the analyzed cell, a result of a directional analysis in the analyzed cell. In some embodiments, the analyzed cell includes the analyzed pixel. In some embodiments, a shape of the analyzed cell is selected from the group consisting of a square of pixels, a rectangle of pixels, a cross-shape of pixels, a semicircular line of pixels, or a line of pixels.

In some embodiments, the allowed statistical distance is based on statistical calculation parameters. In some embodiments, the statistical calculation parameters are selected from the group consisting of a type of statistical distribution analysis, a type of mean function, a type of standard deviation, a minimal value for an allowed statistical deviation of the analyzed pixel, and the allowed statistical deviation expressed in a number of SDs from an SD analysis of the analyzed cell, a distance threshold, and one or more predefined multipliers.

In some embodiments, the method may further include identifying of sharp edge transitions in the analyzed cell. In some embodiments, the method may further include detecting and removing an outlier pixel in the analyzed cell. In some embodiments, the imaging sensor includes a short-wave infrared (SWIR) photodetector array.

This Summary is provided to introduce a selection of concepts in a simplified form that may be further described in the Detailed Description below. It may be understood that this Summary is not intended to identify key features or essential features of the disclosure, nor is it intended to be used to limit the scope of the disclosure. The details of one or more embodiments disclosed herein may be set forth in the accompanying drawings and the description below. Other features will be apparent from the description and drawings, and from the claims.

BRIEF DESCRIPTION OF THE DRAWINGS

Non-limiting embodiments disclosed herein are described below with reference to figures attached hereto that are listed following this paragraph. identical structures, elements or parts that appear in more than one figure are generally labeled with the same numeral in all the figures in which they appear. When similar reference numerals are shown, corresponding description(s) are not repeated, and the interested reader is referred to the previously discussed figure(s) for a description of the like element(s). The drawings and descriptions are meant to illuminate and clarify embodiments disclosed herein, but should not be considered limiting in any way. In particular, variations and modifications apparent to those skilled in the art may be considered without departing from the claimed scope.

DETAILED DESCRIPTION

This disclosure describes systems and methods for detecting defective pixels in an image array, also referred to herein as an "image" or "array", by performing statistical distribution analysis on a set of pixels that includes a pixel to be analyzed. The systems and methods may enable detection and reference to defective pixels in common statistical terms such of SD distances. Further, the systems and methods may be used with image arrays capturing sharp edge brightness transitions. Further, they may enable definition of a range of related parameters to fine tune the detection, for example, by setting a shape of the set of pixels to be analyzed and/or setting minimal thresholds of intensity levels. Further, the disclosed systems and methods provide for continued repeated analysis of an image array and therefore are well suited to handling momentary defective pixel issues such that a momentary defect of a pixel which does not result in the long-term designation of a pixel as defective.

Figure 1A:
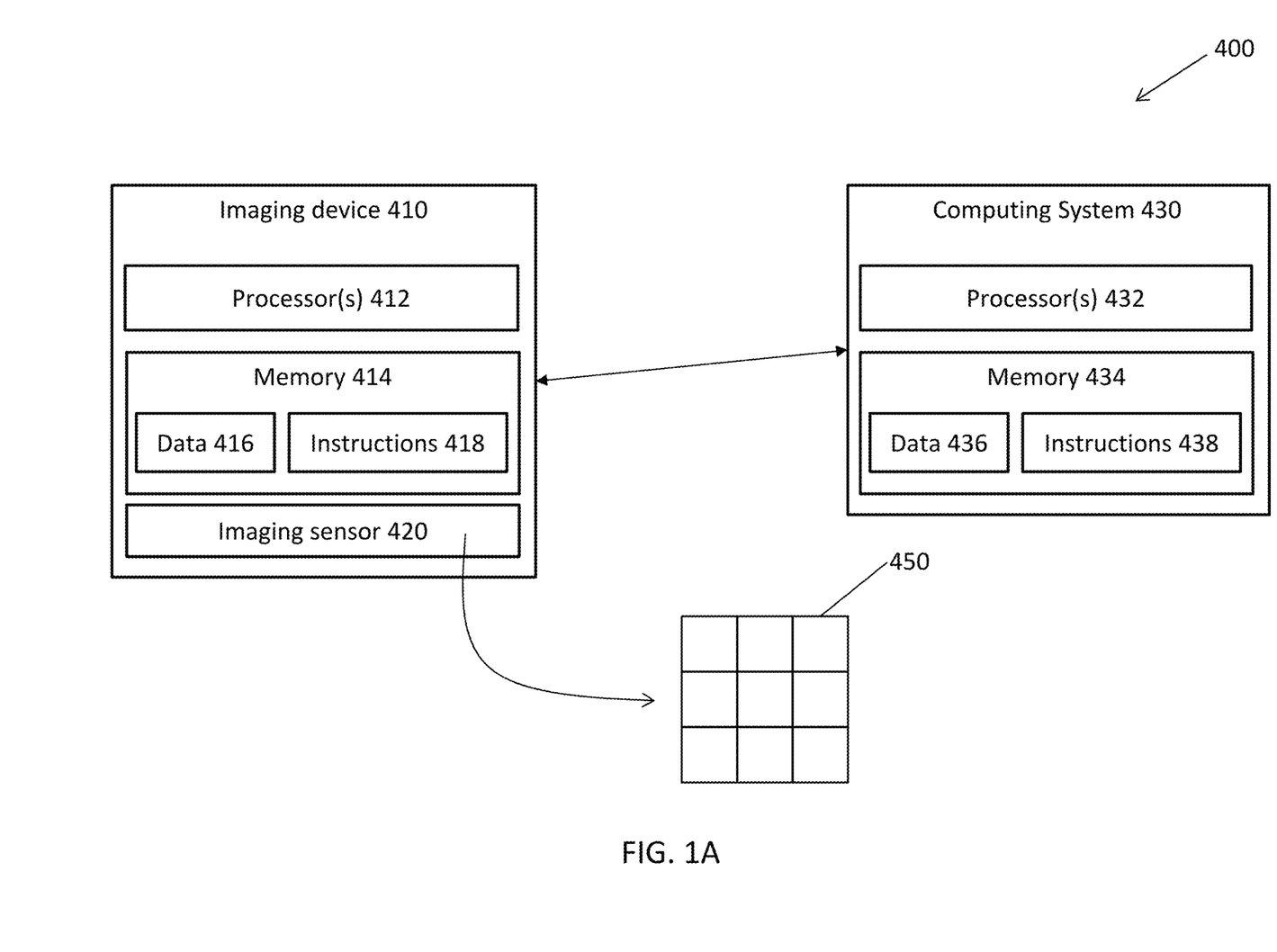
FIG. 1A is a block diagram of a system for detecting defective pixels in an image array in accordance with embodiments disclosed herein.

FIG. 1A is a block diagram of a system for detecting defective pixels in an image array in accordance with embodiments disclosed herein. System 400 may include an imaging device 410 and may be connected, in some embodiments, to a computing system 430.

Imaging device 410 may include one or more processors 412, a memory 414 and one or more imaging sensors 420. One or more processors 412 may be any suitable processing device (e.g., a processor core, a microprocessor, an ASIC, an FPGA, a controller, a microcontroller, etc.) and can be one processor or a plurality of processors that are operatively connected. Memory 414 may include one or more non-transitory computer-readable storage media, such as RAM, ROM, EEPROM, EPROM, flash memory devices, magnetic disks, etc., and combinations thereof. Memory 414 may store data 416 and instructions 418 which may be executed by processor 412 to cause imaging device 410 to perform operations including but not limited to detecting defective pixels in an image, defining cells of pixels to analyze, performing statistical distribution analysis on analyzed cells, determining allowed statistical deviation/distance thresholds for analyzed pixels, detection of sharp edge transitions and performing outlier analysis.

Imaging device 410 may be configured to capture an image array 450 using one or more imaging sensors 420. Imaging sensor 420 may include a short-wave infrared (SWIR) photodetector array, a charge-coupled device (CCD) or a complementary metal-oxide-semiconductor (CMOS) sensor that converts visible or non-visible electromagnetic radiation into an image array.

Figure 1B:
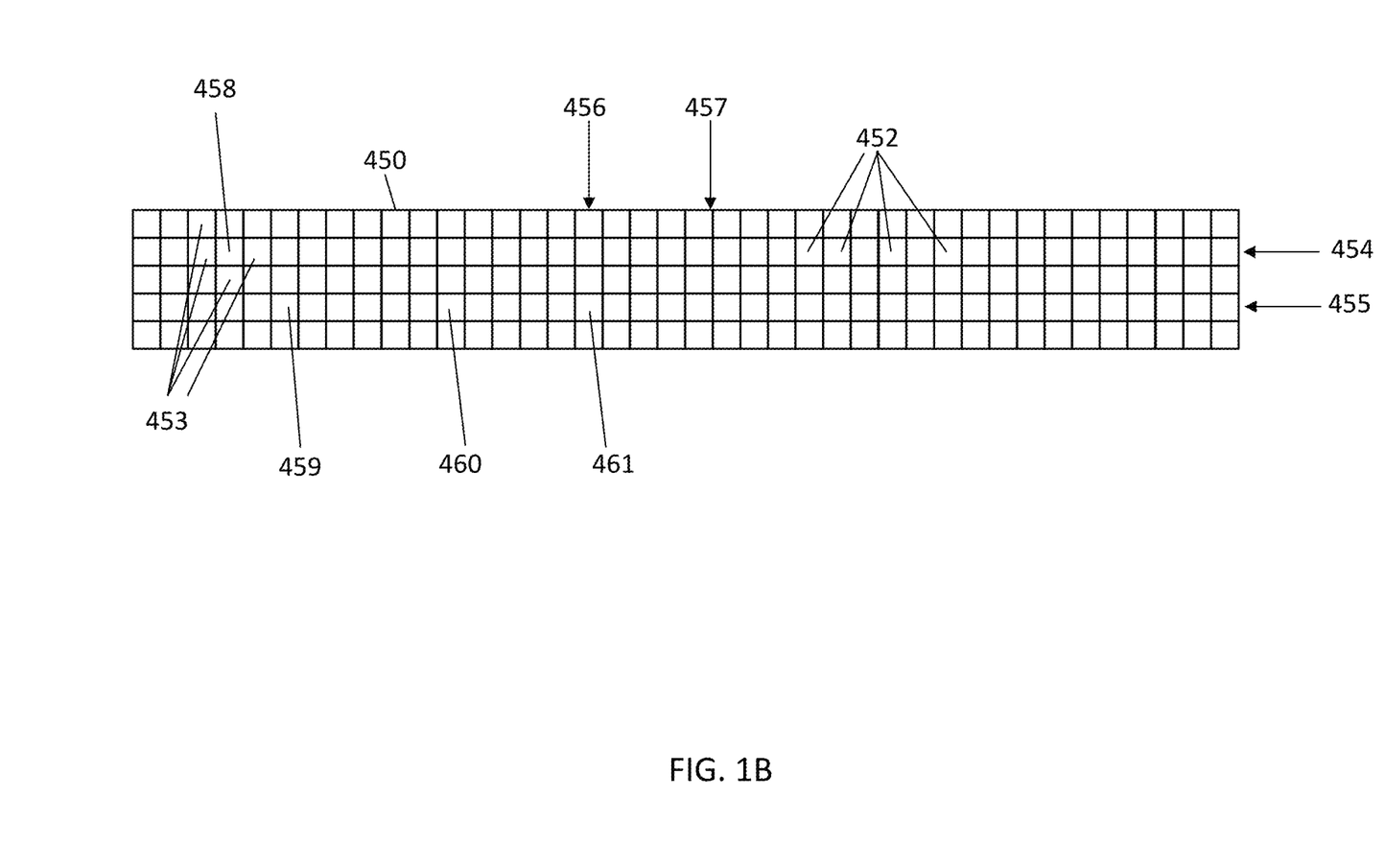
FIG. 1B is an illustrative drawing of an image array in accordance with embodiments disclosed herein.

FIG. 1B is an illustrative drawing of an image array in accordance with embodiments disclosed herein. Image array 450 is an exemplary illustration of an array of pixels. The term "image array" 450 as used herein refers to an array, collection, or a matrix, of pixels 452 (picture elements) typically arranged in rows, e.g., row 454 and row 455 and columns, e.g., column 456 and column 457. Pixels 452 may include a pixel of interest or "analyzed pixel". Each pixel from image array 450 may be chosen or selected as a pixel of interest or "analyzed pixel", for example one or more of pixels 458, 459, 460 and 461. It should be understood to a person skilled in the art that the exemplary size of image array 450 is presented for illustration purposes and that image array 450 may include any size or shape, e.g., any number of rows, columns and pixels may be included in mage array 450.

Figure 1C:
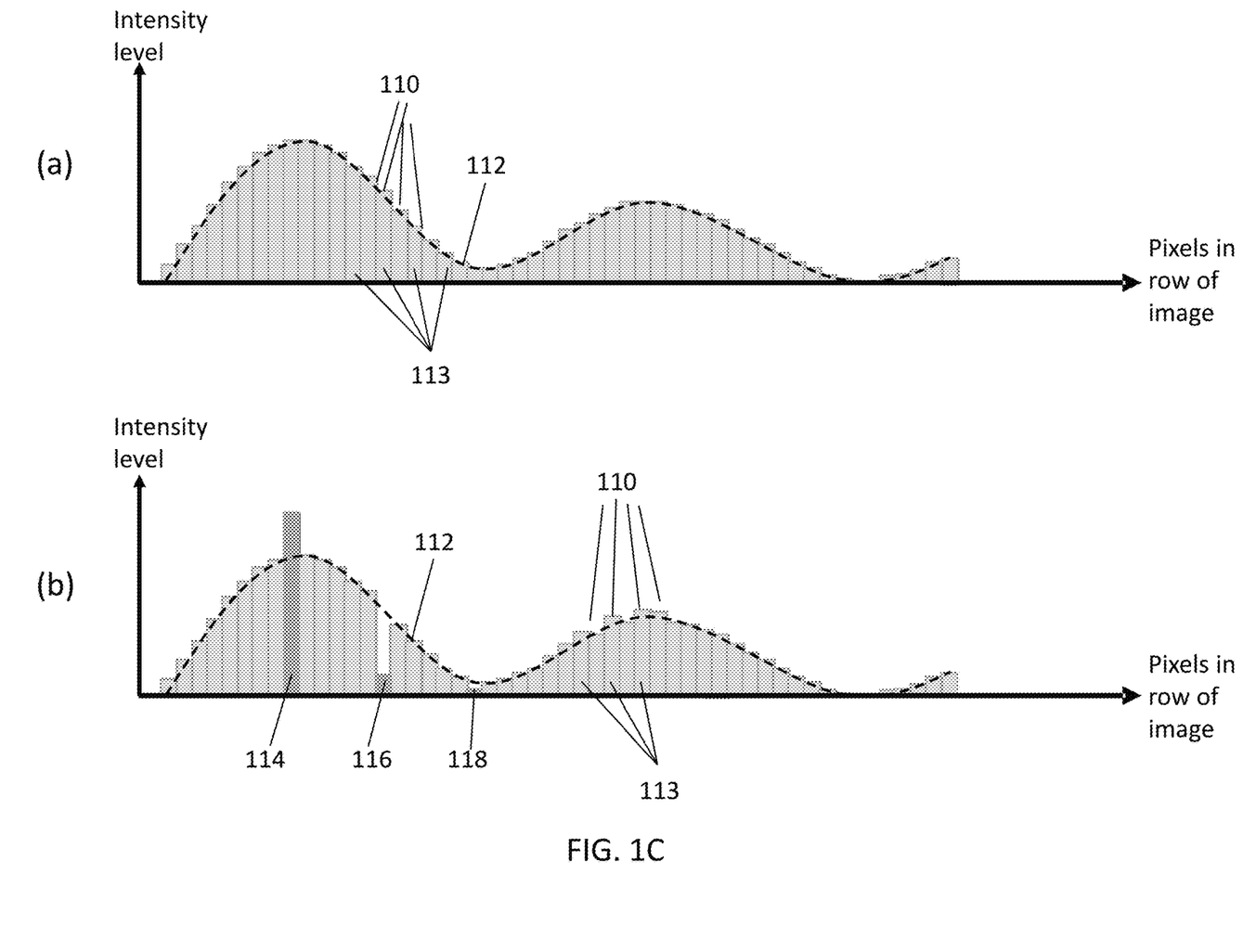
FIG. 1C shows illustrative intensity level graphs for two rows of pixels in an image array in accordance with embodiments disclosed herein.

FIG. 1C shows illustrative intensity level graphs for two rows of pixels in an image array in accordance with embodiments disclosed herein. The illustrative intensity level graphs (a) and (b) represent, respectively, two rows, e.g., row 454 and row 455 of pixels in image array 450 of FIG. 1B such as captured by imaging device 410 of FIG. 1A. FIG. 1C is provided to illustrate the principle of operation of the system and method disclosed herein and is provided as an exemplary illustration. The terms "intensity levels", "signal levels", "brightness", or simply "levels" have the same meaning herein and refer to the intensity level of a pixel, e.g., each of pixels 452 in an image array 450 of FIG. 1B. Each of graphs (a) and (b) represents the intensity level of each of the pixels in a selected row. Each pixel in the image array, e.g., pixel 458 of a row 454 of FIG. 1B is represented by a rectangle 113 in FIG. 1C while the height of each rectangle measured on the "y" axes represents the intensity level of each of the pixels in the row.

FIG. 1C (a) shows a graph of pixel intensity levels 110 for a row of pixels, e.g., row 454 of image array 450 with varying intensity levels also referred to herein as "brightness" along row 454 and without any defective pixel in row 454. As shown in graph (a) an ideal pixel row having no defective pixels may be expected to have a "smooth" transition between intensity levels 110 of pixels 452. The term "smooth" as used here implies that the directional derivative within a small proximity from selected pixels, e.g., from pixels 452 may have relatively small gradient values. Line 112 (dashed) may be derived from a statistical distribution analysis of the expected intensity of pixels 453 surrounding a particular pixel 458 in row 454. For example, pixel 458 may be a correct, non-defective pixel, therefore pixel intensities 110 of graph (a) may be expected to show a normal distribution around line 112.

FIG. 1C (b) shows a graph of pixel intensity levels 110 for a pixel, e.g., row 455 of an image array 450 with varying intensity levels or brightness along row 455. Row 455 may include a plurality of defective pixels, e.g., pixels 459, 460, and 461 of FIG. 1B. Line 112 may be derived from a statistical distribution analysis of the expected intensity of pixels surrounding a particular pixel on row 455. The defective pixels 459, 460, and 461 may be detected based on intensity levels that diverge from the expected intensity of line 112. For example, intensity level 114 of pixel 459 is higher than the average value of the surrounding pixels, e.g., it is highly deviates or has abnormal derivative value relative to surrounding pixels. For example, intensity level 116 of pixel 460 is lower than the average value of the surrounding pixels, e.g., it is highly deviates or has abnormal derivative value relative to surrounding pixels indicating defective pixels that may require correction. While some pixels, such as pixel 461 are defective, their corresponding intensity may not be distinct enough (e.g., the intensity level may not deviate relative to surrounding pixels) to be detected relative to line 112 such as intensity level 118, and the corresponding pixel 461 therefore may not need any correction, although it is a defective pixel. As described in some embodiments, defective pixels 459, 460, and 461, illustrated for example, by FIG. 1C (b) may be detected based on a statistical analysis of the intensity of the surrounding pixels, e.g., of row 454 or other pixels selected to be included in an analyzed cell.

Referring back to FIG. 1A, in some embodiments, system 400 may include a computing system 430 that is in data communication with imaging device 410. Computing system 430 may be separate from or may be a portion of imaging device 410. For example, in some embodiments, computing system 430 may be implemented as an integral element of imaging device 410, e.g., as illustrated by processors 412 and memory 414, while in some embodiments, computing system 430 may be implemented as a standalone unit, separated and/or remotely connected to imaging device 410. Computing system 430 may include one or more processors 432 and a memory 434. One or more processors 432 may be any suitable processing device (e.g., a processor core, a microprocessor, an ASIC, an FPGA, a controller, a microcontroller, etc.) and can be one processor or a plurality of processors that are operatively connected. Memory 434 may include one or more non-transitory computer-readable storage media, such as RAM, ROM, EEPROM, EPROM, flash memory devices, magnetic disks, etc., and combinations thereof. Memory 434 may store data 436 and instructions 438 which may be executed by processor 432 to cause computing system 430 to perform operations including but not limited to detecting defective pixels in an image, defining cells of pixels to analyze, performing statistical distribution analysis on analyzed cells, determining allowed statistical deviation/distance thresholds for analyzed pixels, detection of sharp edge transitions and performing outlier analysis.

In some implementations, imaging device 410 or computing system 430 may include or is otherwise implemented by one or more computing devices. In instances in which imaging device 410 or computing system 430 includes one or more computing devices, such computing devices may operate according to sequential computing architectures, parallel computing architectures, or some combination thereof. Either or both imaging device 410 or computing system 430 may include a user interface (not shown) for configuration of parameters as described herein, for example, predefined parameters such as analysis parameters and statistical calculation parameters.

Figure 2A:
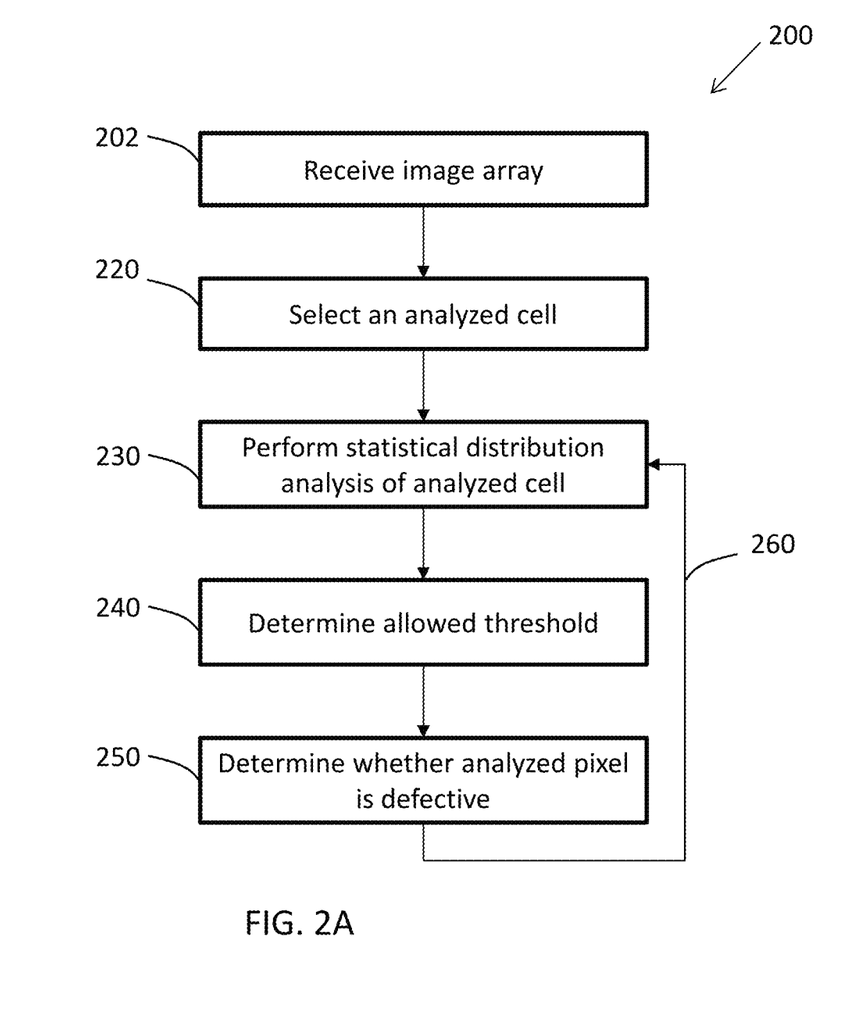
FIG. 2A shows a flowchart of process for detecting a defective pixel in an image array in accordance with embodiments disclosed herein.

FIG. 2A shows a flowchart of process for detecting a defective pixel in an image array in accordance with embodiments disclosed herein. Process 200 shown in FIG. 2A, may be implemented, for example, in system 400 of FIG. 1A as described herein. A non-transitory computer readable medium may contain instructions which, when executed by at least one processor, perform the method and operations described at each of the steps in process 200. The non-transitory computer readable medium and at least one processor may correspond to one or more of processors 412 and/or 432, and memory 414 and/or 434 as described herein. In some embodiments, process 200 may be performed "on-the-fly" implying that process 200 may be performed while image arrays (e.g., image array 450) are received from an imaging device, (e.g., imaging device 410).

In step 202, an image array may be received by imaging device. The image array or the digital image may be captured by a sensor, e.g., by imaging sensor 420, of imaging device 410 having an array of photodetectors where each photodetector is located at a respective pixel position. The digital image may include a plurality of pixels, each pixel represents an amount of light captured by a respective photodetector of a photodetector array of the sensor.

In step 220, an analyzed cell may be selected based on predefined analysis parameters. The analyzed cell may include a plurality of pixels from the image array and may further include the analyzed pixel. In this step, a pixel from the image array may be selected for analysis (herein referred to as an "analyzed pixel") in order to decide if this selected pixel is a defect pixel or a valid pixel. For each analyzed pixel, the surrounding pixels of the analyzed pixel to be included in the analysis are chosen (herein referred to as an "analyzed cell". The analyzed cell may include the analyzed pixel and nearby pixels which are selected based on parameters which may be defined or predetermined by system 400 or a user of system 400 of FIG. 1A. Choosing, selecting or defining an analyzed cell may include a decision, a choice or a determination based on predefined analysis parameters such as a shape of the analyzed cell and/or a size of the analyzed cell and/or inclusion of the analyzed pixel in the analyzed cell and/or a result of a directional analysis of pixels in the analyzed cell or in the image array, for example, an intensity of a gradient detected in the directional analysis of pixels in the analyzed cell or in the image array. Any other predefined analysis parameter may be used for selecting the analyzed cell. In some embodiments disclosed herein, predefined analysis parameters may be based on or may include information related to the image array such as, the size of the image, the unity of the intensity level in the image, the distribution of intensity level in the image, segmentation to homogeneous areas in the image and the like.

In some embodiments disclosed herein, all the pixels in the image array may be selected for analysis, e.g., in order to decide for every pixel in the image array if it is a defect pixel or a valid pixel. The analysis process for each of the pixels in the image array may be performed sequentially or in parallel according to the implementation of system 400. In some embodiments, the same analyzed cell shape may be selected for all the pixels in the image array while in other embodiments a different analyzed cell shape may be chosen for each of the pixels in the image array or for a plurality of pixels or group of pixels in the image array.

In some embodiments disclosed herein, the analyzed cell may not include the analyzed pixel and may include pixels related to the analyzed pixel, e.g., pixels found in a predefined proximity or distance to the analyzed pixel. An analyzed cell may include a predefined number of pixels from the image array, arranged in a predefined order relative to the analyzed pixel. In some embodiments, if a pixel is known to be defective, determined for example during a calibration process, then that pixel may not be analyzed. In some embodiments, all pixels in the image array may be sequentially analyzed to determine whether any pixels are defective.

Figure 2B:
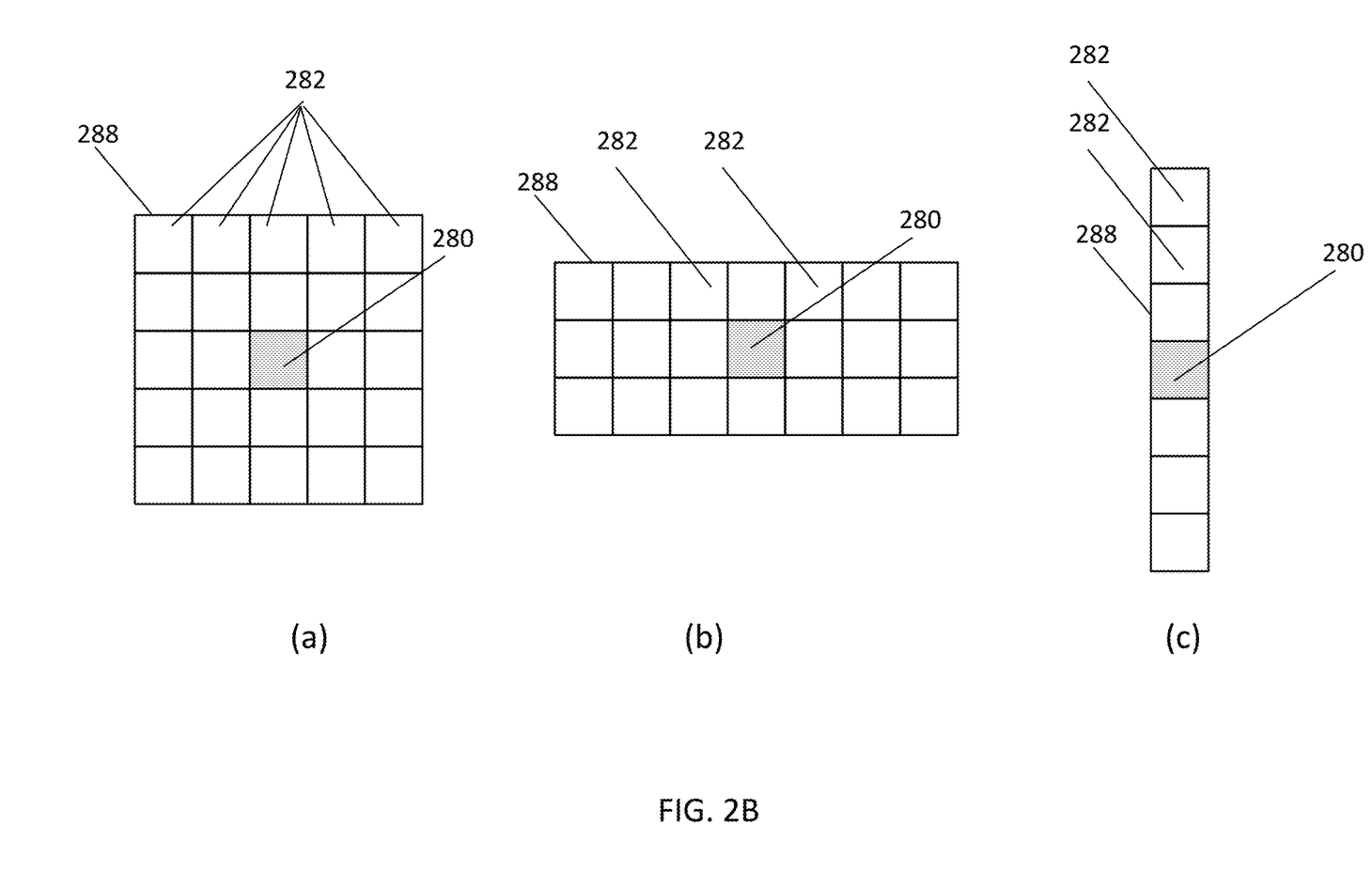
FIGS. 2B-2C show exemplary shapes for analyzed cells used in a statistical distribution analysis in accordance with embodiments disclosed herein.
Figure 2C:
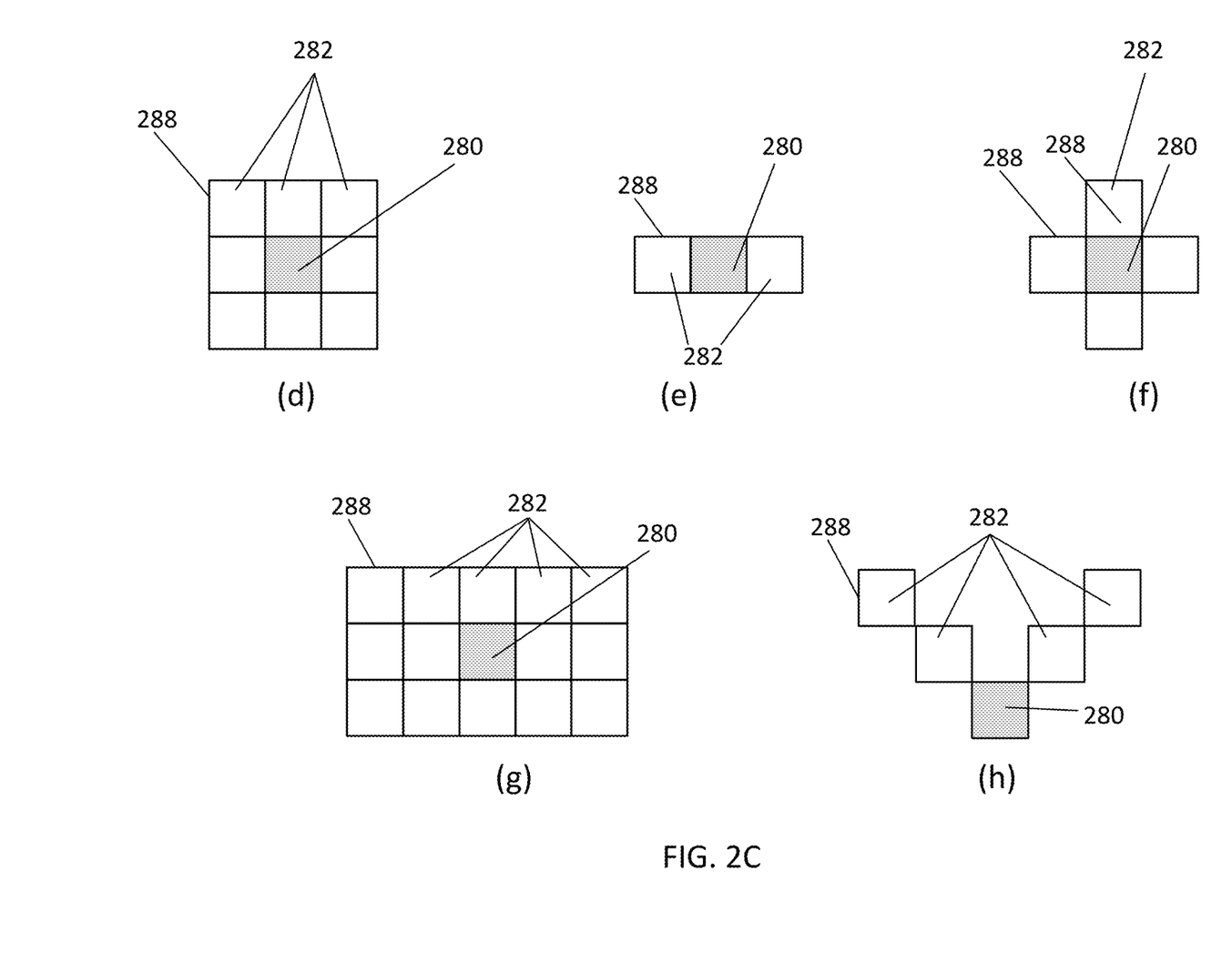

FIGS. 2B-2C show exemplary shapes for analyzed cells used in a statistical distribution analysis in accordance with embodiments disclosed herein. The illustrated shapes (a), (b) and (c) of FIGS. 2B-2C may be selected in step 220 of process 200 of FIG. 2A. Each cell 288 may include a predefined number of pixels 282 from the image array, arranged in a predefined order relative to the analyzed pixel 280. The shape of the analyzed cell may include the analyzed pixel 280 and adjacent pixels 282 and may be based on one or more predefined cell shapes, configurations, structures or arrangements. The shape of the analyzed cell may be selected from the group consisting of a square of pixels, a rectangle of pixels, a line of pixels, a cross-shape or a semicircular shape. The illustrated shapes (a)-(h) of FIGS. 2B-2C are exemplary shapes for analyzed cells used in a statistical distribution analysis and should not be considered limiting in any way. It should be understood to a person skilled in the art, that any other cell shape may be selected. FIG. 2B (a) shows a 5×5 pixel cell square shaped cell 288 with analyzed pixel 280 in the center surrounded by adjacent pixels 282 (not all pixels are labelled for simplicity). Alternatively, in some embodiments, a rectangular 3×7 (b) or 3×5 (g) pixel cell 288 may be selected with analyzed pixel 280 in the center surrounded by adjacent pixels 282 (not all pixels are labelled for simplicity). Alternatively, in some embodiments, a vertical 7×1 pixel cell 288 (c) may be selected.

FIG. 2C (d) shows a "donut" shaped cell 288 with analyzed pixel 280 in the center surrounded by adjacent pixels 282 (not all pixels are labelled for simplicity). Alternatively, in some embodiments, a horizontal 1×3 pixel cell 288 (e) may be selected. Alternatively, in some embodiments, a "cross" cell (f) may be selected. Alternatively, in some embodiments, a semicircular cell (h) may be selected. It should be understood that the predefined shapes for analyzed cells presented in FIGS. 2B and 2C are only exemplary shapes and sizes of analyzed cells. Any other shape and size for analyzed cell may be chosen. Additionally, the predefined shapes for analyzed cells presented in FIGS. 2B and 2C are merely symmetric shapes, however a predefined cell may include a non-symmetric cell shape.

In some embodiments, a cell shape may be defined and then a mask may be applied to identify the pixels that will be included in the statistical analysis. As shown in FIG. 2B, pixels 282 termed "adjacent" or "surrounding" to analyzed pixel 280 may not be immediately adjacent to analyzed pixel 280, i.e.: may be separated from analyzed pixel 280 by other pixels 282.

In a preliminary configuration step, performed before activation of process 200, e.g., prior to step 220 of FIG. 2A, predefined parameters such as analysis parameters and statistical calculation parameters may be chosen for system 400. The predefined analysis parameters may be used in order to select the analyzed cell, e.g., the size and shape of the analyzed cell may be chosen based on the predefined parameters. The predefined statistical calculation parameters may be used for the process of performing statistical distribution analysis for the plurality of pixels in the analyzed cell.

The predefined analysis parameters may include but are not limited to: a shape of the analyzed cell (such as of FIG. 2B-2C), a size of the analyzed cell, whether the analyzed pixel is included in the statistical distribution analysis of the analyzed cell, a result of a directional analysis of pixels in the analyzed cell or in the image array, and an intensity of a gradient detected in the directional analysis.

The predefined statistical calculation parameters may include but are not limited to: a type of statistical distribution analysis, a type of mean function, a type of SD, a minimal value for an allowed statistical deviation of the analyzed pixel, and the allowed statistical deviation expressed in a number of SDs from an SD analysis of the analyzed cell, a distance threshold, and one or more predefined multipliers.

According to some embodiments, during the configuration step, performed before activation of process 200, a preliminary optimization process may be performed in order assist or to further optimize the selected analyzed cell, e.g., selecting the size and the shape of the analyzed cell. The optimization process may include a plurality of trials on different cells, e.g., different sizes and shapes of cells, e.g., such as of FIGS. 2B and 2C., cells including the analyzed pixel and cells which do not include the analyzed pixel. The predefined analysis parameters may be the results of such an optimization process which is performed during the configuration step.

In step 230, for each of the analyzed pixels, statistical distribution analysis may be performed for the plurality of pixels in the analyzed cell, e.g., for pixels included in the analyzed cell. The statistical distribution analysis may include calculating statistical values which may indicate regarding one or more characteristics of the values of the pixels included in the analyzed cell. For example, the statistical distribution analysis may include calculating statistical values such as but not limited to: a mean value, and/or median value and/or an SD value based on the intensity levels of pixels included in the analyzed cell chosen in step 220. In some embodiments, the intensity level of the analyzed pixel is not included in the statistical distribution analysis calculation.

In step 240, an allowed statistical distance for the analyzed pixel, relative to the analyzed cell, may be determined. The allowed statistical distance, is a maximum value between an allowed statistical deviation and a predefined minimum distance. The allowed statistical distance, also referred to as "allowed statistical threshold" denoted "$V_{th}$" is defined as the maximum value between the following values: a) an allowed statistical deviation also denoted "$M\sigma$" and calculated for the plurality of pixels in the analyzed cell and b) a distance threshold also denoted "$M_{th}$" which is a predefined minimum distance. $M_{th}$ may be defined in physical units according to the image array measured units, e.g., grey level, millivolts or any other measuring unit and it may be determined by the system or by a user or may be included in the predefined statistical calculation parameters. The allowed statistical deviation ($M\sigma$) may be for example, a product of a predefined multiplier, e.g., an integer or non-integer multiplier and the SD calculated on the plurality of pixels in the analyzed cell. The predefined multiplier may be included in the predefined statistical calculation parameters.

In step 250 a determination is made for each of the analyzed pixels as to whether a pixel is a defective pixel or not. If a computed statistical distance of the analyzed pixel exceeds or is higher than the allowed statistical distance (determined in step 240), then the analyzed pixel may be determined to be defective. The computed statistical distance may be a relative value which indicates the intensity level of the analyzed pixel in comparison to a statistic center of the intensity levels of the pixels included in the analyzed cell. For example, in some embodiments, the computed statistical distance is calculated or computed by comparing the intensity level of the analyzed pixel to a statistic intensity level value of the pixels in the analyzed cell (such as mean or median) to determine whether the analyzed pixel is defective according to the following equation:

$$\text{Defect} = \begin{cases} |p-\mu| > V_{th} \\ |p-\mu| \le V_{th} \end{cases} = \begin{cases} 1 \\ 0 \end{cases} \text{ for } V_{th} = \max(M\sigma, M_{th})$$

where p is an analyzed pixel intensity level, $\mu$ is a measure of the center of population such as but not limited to mean or median intensity level value of pixels in an analyzed cell and $|p-\mu|$ is an absolute value of the computed statistical distance, $V_{th}$ is a threshold value defined as the allowed statistical distance, $M\sigma$ is an allowed statistical deviation which is an integer or non-integer predefined multiplier to the SD of the adjacent pixels; and $M_{th}$ is a distance threshold which is a user-defined minimum threshold value. In some embodiments, $M\sigma$ is provided as a user-defined calibration value to express a certainty level that an analyzed pixel must be considered valid, for example a value of 1 means 68%, 2 means 95%, 3 means 99.7% etc. Any other value may be used. The distance threshold, the predefined multiplier and any other parameter required for the statistical distribution analysis may be included in the predefined statistical calculation parameters.

According to embodiments disclosed herein, process 200 may include the step of determining that an analyzed pixel is a defective pixel if a computed statistical distance of the analyzed pixel exceeds the allowed statistical distance. This step may be performed for each pixel in the image array. In some embodiments, this process may be an iterative process indicated by arrow 260 which means that steps 230-250 may be repeated for every pixel in the image array while in other embodiments the step of determining that an analyzed pixel is a defective pixel may be performed in a parallel computation for all the pixels in the image array, e.g., according to processing configuration of system 400. Alternatively, in some embodiments the iterative process indicated by arrow 260 may start from step 220 which means that steps 220-250 may be repeated for every pixel in the image array.

In some embodiments, a pixel that has been determined to be defective using process 200 may undergo some form of correction or may be marked as defective, e.g., in an additional step following step 250.

Figure 3A:
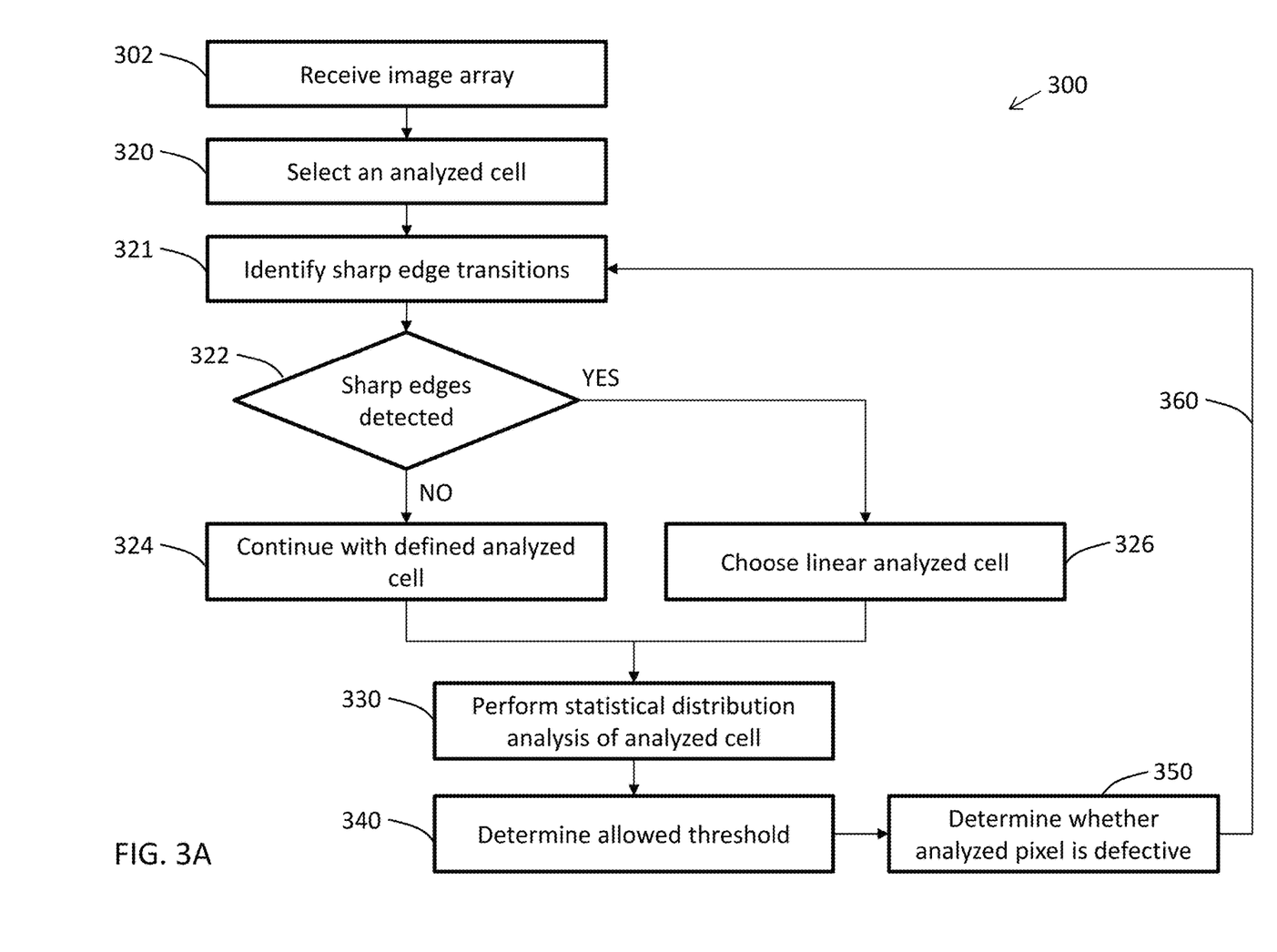
FIG. 3A shows a flowchart of process for detecting a defective pixel in an image array including sharp edges detection in accordance with embodiments disclosed herein.

FIG. 3A shows a flowchart of process for detecting a defective pixel in an image array including sharp edges detection in accordance with embodiments disclosed herein. Process 300 shown in FIG. 3A may be implemented or performed, for example, by the system shown in FIG. 1A. A non-transitory computer readable medium may contain instructions which, when executed by at least one processor, perform the method and operations described at each of the steps in process 300. The non-transitory computer readable medium and at least one processor may correspond to one or more of processors 412 and/or 432, and memory 414 and/or 434 as described herein. In some embodiments, process 300 may be performed "on-the-fly" implying that process 300 may be performed as image arrays (such as image array 450) are received from an imaging device.

In some embodiments, an image may include a sharp transition between areas with certain similar characteristics, e.g., sharp color transition, transition between black and white and the like. For example, some images may include sharp edge brightness transitions, for example an image of a straight-line shadow where the shadow portion is dark relative to an adjacent non-shadow portion. Pixels in the region of the sharp edge transition may have very different levels of brightness and this may affect the statistical distribution analysis. Therefore, in some embodiments, sharp edge detection may be performed before statistical distribution analysis in order to avoid or reduce sharp edge transition effect.

Process 300 includes detection of sharp edge transitions and an option to preserve sharp edge transitions. Some operations described in steps of process 300 are similar to operations presented in FIG. 2A and their description may be similar. For example, steps 302, 320, 330, 340 and 350 of FIG. 3A are similar to steps 202, 220, 230, 240 and 250 of FIG. 2A, respectively.

In step 302, an image array may be received by imaging device. The digital image array may be captured by a sensor, e.g., by imaging sensor 420, of imaging device 410 having an array of photodetectors where each photodetector is located at a respective pixel position. The image may include a plurality of pixels, each pixel represents an amount of light captured by a respective photodetector of a photodetector array of the sensor.

In step 320, an analyzed cell may be selected based on predefined analysis parameters. The analyzed cell may include a plurality of pixels including an analyzed pixel. Selecting, choosing or defining an analyzed cell may include a decision, a choice or a determination regarding a shape of the analyzed cell and/or a size of the analyzed cell based on predefined analysis parameters. For example, the shape of the analyzed cell including the analyzed pixel and adjacent pixels may be based on one or more predefined shapes, for example, such as shown in FIG. 2B or 2C. An analyzed cell may include a predefined number of pixels from the image array, arranged in a predefined order relative to the analyzed pixel. The shape of the analyzed cell may be selected from the group consisting of a square of pixels, a rectangle of pixels, or a line of pixels. In some embodiments, a predefined cell shape may be defined or selected and then a mask may be applied to identify the pixels that will be included in the statistical analysis.

In step 321 one or more sharp edge transitions in the analyzed cell may be identified. The determination or identifying process may include performing a gradient analysis of the intensity of linear sets of pixels in various directions in the analyzed cell by differentiating the pixels in the analyzed cell under consideration in the X and Y directions, e.g., by a directional derivative. In some embodiments, sharp edges may be detected by determining whether a value defined by the following operations on the gradient function is higher than a certain predefined threshold "$D_{th}$"

$$\left\| \frac{\partial L}{\partial x}, \frac{\partial L}{\partial y} \right\| > D_{th}$$

where L is the collection of pixels values within the selected analyzed cell and x and y are the horizontal and vertical directions within the analyzed cell. Alternatively, other edge detection algorithms may be used and any other mathematical expression may be used for detection of sharp edge transitions.

The angle or the direction of the gradient function may be determined by a mathematical calculation:

$$\theta = \arctan\left(\frac{\left(\frac{\partial L}{\partial y}\right)}{\left(\frac{\partial L}{\partial x}\right)}\right)$$

In step 322, if a gradient, is higher than a predefined threshold, then a sharp edge is detected and the affected pixels may be determined. For example, when a value, e.g., $$\left\| \frac{\partial L}{\partial x}, \frac{\partial L}{\partial y} \right\|$$

is higher than a certain predefined threshold ($D_{th}$) a sharp edge is considered as detected and a transition to linear kernel or linear cell shape is performed (as described in step 326). if a gradient, is not higher than a predefined threshold, then a sharp edge is not detected and process 300 continues with the previously defined analyzed cell (as described in step 324).

Step 322 may include a decision regarding whether a sharp edge transition is detected based on the detection performed in step 321. Step 322 may include a determination about the presence in the image of sharp edge transitions and the pixels affected by the detected sharp edge transitions. Based on the results of the sharp edge transition detection of step 321, a decision is made and the next step in process 300, e.g., step 324 or step 326 is selected depending on whether a sharp edge transition is detected in step 320, namely if an analyzed pixel is affected by a detected sharp edge transition. If no sharp edge transition is detected and no effect on the analyzed pixel, then, in step 324, process 300 may continue with the predefined analyzed cell shape which was defined in step 320.

Figure 3B:
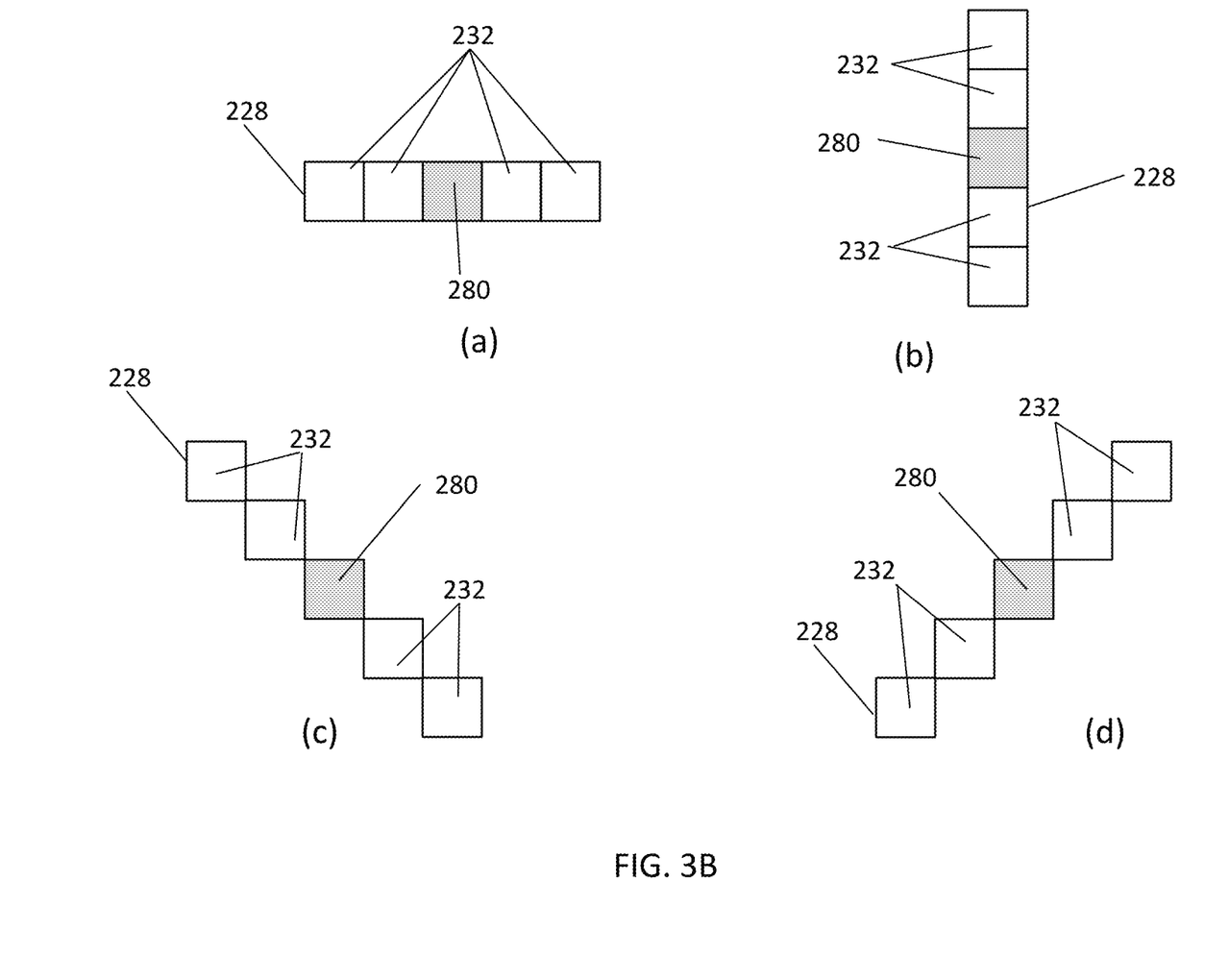
FIG. 3B shows exemplary predefined linear shapes for analyzed cells used in a statistical distribution analysis in accordance with embodiments disclosed herein.

If a sharp edge transition is detected and affects the analyzed pixel, then process 300 continues to step 326. In step 326 a predefined linear analyzed cell shape is being chosen or selected. For example, the shape of the analyzed cell including the analyzed pixel and adjacent pixels may be based on one or more predefined shapes that substantially conform to the edge transition, for example, such as shown in FIG. 3B (a)-(d). The selection of the linear analyzed cell shape from the linear analyzed cell shapes of FIG. 3B may be based on the angle of the gradient function calculated in step 321.

For example, linear analyzed cell shape (a) may be selected if the calculated angle of the gradient function is 90°±22.5°, linear analyzed cell shape (b) may be selected if the calculated angle of the gradient function is 0°±22.5°, linear analyzed cell shape (c) may be selected if the calculated angle of the gradient function is 45°±22.5° and linear analyzed cell shape (d) may be selected if the calculated angle of the gradient function is −45°±22.5° (minus 45 or 315). Other cell shapes may correspond to other angle ranges.

FIG. 3B shows exemplary predefined linear shapes for analyzed cells used in a statistical distribution analysis in accordance with embodiments disclosed herein. Predefined shapes for analyzed cells (a)-(d) are exemplary predefined linear cell shapes that substantially conform to the edge transition and to the angle of the transition within the analyzed cell. Alternative cell shapes may be used and the examples of FIG. 3B (a)-(d) should not be considered limiting.

Steps 330-350 are similar to steps 230-250 of process 200 of FIG. 2A, respectively.

In step 330, statistical distribution analysis may be performed on the analyzed cell which is the original analyzed cell selected in step 320 or the updated linear analyzed cell selected in step 326. The statistical distribution analysis may include calculating a mean, and/or median and an SD value based on the intensity levels of pixels included in the analyzed cell chosen in steps 320 or 326. The operations performed in step 330 are similar to operations described with reference to step 230 of process 200 in FIG. 2A.

In step 340, an allowed statistical distance for the analyzed pixel relative to the analyzed cell may be determined. The allowed statistical distance is a maximum value between an allowed statistical deviation and a predefined minimum distance. The allowed statistical distance, also referred to as allowed statistical threshold denoted "$V_{th}$" is defined as the maximum value between the following values: a) an allowed statistical deviation also denoted "Mσ" and calculated for the plurality of pixels in the analyzed cell and b) a distance threshold also denoted "$M_{th}$" which is a predefined minimum distance. $M_{th}$ may be defined in physical units according to the image array measured units, e.g., grey level, millivolts or any other measuring unit and it may be determined by the system. The allowed statistical deviation (Mσ) may be for example, a product of a predefined multiplier, e.g., an integer or non-integer multiplier and the SD calculated on the plurality of pixels in the analyzed cell.

In step 350 a determination is made for each of the analyzed pixels, whether a pixel is a defective pixel or not. If a computed statistical distance of the analyzed pixel exceeds or is higher than the allowed statistical distance (determined in the statistical distribution analysis), then the analyzed pixel may be determined to be defective. The computed statistical distance may be a relative value which indicates the intensity level of the analyzed pixel in comparison to a statistic center of the intensity levels of the pixels included in the analyzed cell. For example, in some embodiments, the computed statistical distance is calculated or computed by comparing the intensity level of the analyzed pixel to a statistic intensity level value of the pixels in the analyzed cell (such as mean or median) to determine whether the analyzed pixel is defective according to the following equation:

$$\text{Defect} = \begin{cases} |p-\mu| > V_{th} \\ |p-\mu| \le V_{th} \end{cases} = \begin{cases} 1 \\ 0 \end{cases} \text{ for } V_{th} = \max(M\sigma, M_{th})$$

where p is an analyzed pixel intensity level, u is a measure of the center of population such as but not limited to mean or median intensity level value of pixels in an analyzed cell and $|p-\mu|$ is an absolute value of the computed statistical distance, $V_{th}$ is a threshold value defined as the allowed statistical distance, $M\sigma$ is an allowed statistical deviation which is an integer or non-integer multiplier to the SD of the adjacent pixels; and $M_{th}$ is a distance threshold which is a user-defined minimum threshold value. In some embodiments, $M\sigma$ is provided as a user-defined calibration value to express a certainty level that an analyzed pixel must be considered valid, for example a value of 1 means 68%, 2 means 95%, 3 means 99.7% etc. Any other value may be used.

According to embodiments disclosed herein, process 300 may include the step of determining that an analyzed pixel is a defective pixel if a computed statistical distance of the analyzed pixel exceeds the allowed statistical distance may be performed for each pixel in the image array. In some embodiments, this process may be an iterative process indicated by arrow 360 which means that steps 321-350 may be repeated for every pixel in the image array while in other embodiments the process of determining that an analyzed pixel is a defective pixel if a computed statistical distance of the analyzed pixel exceeds the allowed statistical distance may be performed in a parallel computation for all the pixels in the image array, e.g., according to processing configuration of system 400. Alternatively, in some embodiments the iterative process indicated by arrow 360 may start from step 320 which means that steps 320-350 may be repeated for every pixel in the image array.

In a preliminary configuration step, performed before activation of process 300, e.g., prior to step 330 in FIG. 3A. predefined parameters such as analysis parameters and statistical calculation parameters may be chosen for system 400. The predefined analysis parameters may include but are not limited to: a shape of the analyzed cell (such as of FIG. 2B or FIG. 3B), whether the analyzed pixel is included in the statistical distribution analysis of the analyzed cell, a result of a directional analysis, and an intensity of a gradient detected in the directional analysis. The predefined statistical calculation parameters may include but are not limited to: a type of statistical distribution analysis, a type of mean function, a type of SD, a minimal value for an allowed statistical deviation of the analyzed pixel, and the allowed statistical deviation expressed in a number of SDs from an SD analysis of the analyzed cell. The size and shape of the analyzed cell may be chosen based on the predefined parameters.

Figure 4:
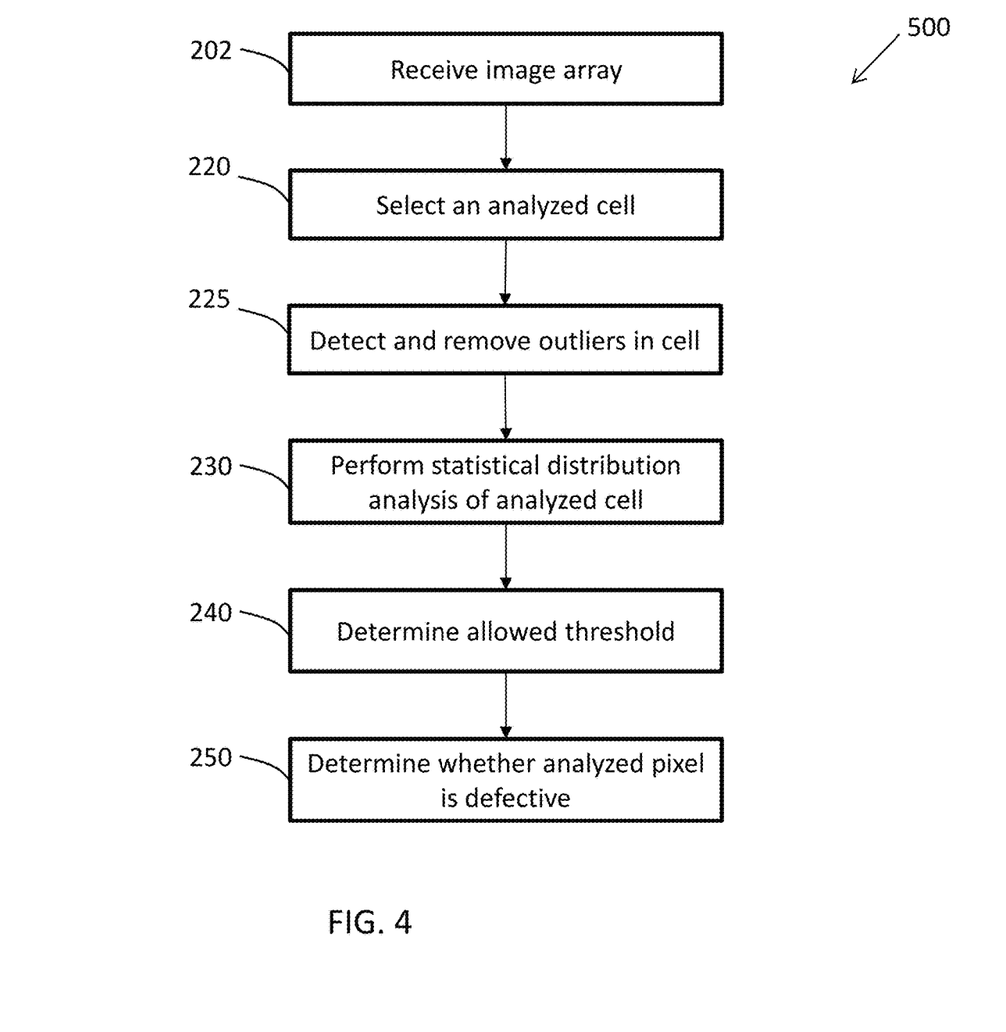
FIG. 4 shows a flowchart of process for detecting a defective pixel in an image array including an outlier pixel elimination process in accordance with embodiments disclosed herein.

FIG. 4 shows a flowchart of process for detecting a defective pixel in an image array including an outlier pixel elimination process in accordance with embodiments disclosed herein.

Operations of embodiments for detecting a defective pixel in an image array including the outlier elimination process are similar to operations with similar reference numerals presented in FIG. 2A and will not be described again. Process 500 of FIG. 4 is similar to process 200 of FIG. 2A with additional step 225 which includes operations required for outlier analysis and elimination process.

Process 500 shown in FIG. 4 may be implemented or performed, for example, by the system shown in FIG. 1A. A non-transitory computer readable medium may contain instructions which, when executed by at least one processor, perform the method and operations described at each of the steps in process 500. The non-transitory computer readable medium and at least one processor may correspond to one or more of processors 412 and/or 432, and memory 414 and/or 434 as described herein. In some embodiments, process 500 may be performed "on-the-fly" implying that process 500 may be performed as image arrays (such as image array 450) are received from an imaging device.

In step 202, an image array may be received by imaging device. The image array or the digital image may be captured by a sensor, e.g., by imaging sensor 420, of imaging device 410 of In some embodiments, in order to detect outlier pixels in the adjacent pixels that may invalidate the statistical distribution analysis, step 225 may be performed. Assuming that in a small area round the pixel there is a "constant" color, removal of an element from the sample (for example but not limited to one or more top most element, one or more lower most elements, etc.) the statistical data should not change by much and therefore outlier elimination may not affect the image array.

In step 225 outlier pixels in the analyzed cell may be detected and eliminated or removed from the analyzed cell. In some embodiments, detection of outlier pixels may be performed by sorting the pixels adjacent to the analyzed pixel by order of intensity levels and removing one or more pixels with the highest or lowest intensity level values or one or more pixels with both of highest and lowest intensity level values. Any other mechanism, method or algorithm for detecting outliers may be used in step 225. For example, in some embodiments, an outlier detection mechanism such as the "maximum normalized residual test". In some embodiments, an iterative sampling method may be used for outlier detection for example, the random sample consensus (RANSAC) algorithm. Any other mechanism, method or algorithm for detecting outliers may be used.

After outliers are detected and removed, process 500 may continue with steps 230-250 as described in FIG. 2A.

Unless otherwise defined, all technical and scientific terms used herein have the same meaning as commonly understood by one of ordinary skill in the art. The materials, methods, and examples provided herein are illustrative only and not intended to be limiting.

Implementation of methods disclosed herein may involve performing or completing certain selected tasks or steps manually, automatically, or a combination thereof. Moreover, according to actual instrumentation and equipment, several selected steps may be implemented by hardware (HW) or by software (SW) on any operating system of any firmware, or by a combination thereof. For example, as hardware, selected steps could be implemented as a chip or a circuit. As software or algorithm, selected steps could be implemented as a plurality of software instructions being executed by a computer using any suitable operating system. In any case, selected steps could be described as being performed by a data processor, such as a computing device for executing a plurality of instructions.

Disclosed embodiments include methods, systems, devices, and computer-readable media. for providing a technical solution to the challenging technical problem of detecting a defective pixel in an image array, and relate to a system for detecting a defective pixel in an image array with the system having at least one processor (e.g., processor, processing circuit or other processing structure described herein). For ease of discussion, example methods are described herein with the understanding that aspects of the example methods apply equally to systems, devices, and computer-readable media. For example, some aspects of such methods may be implemented by a computing device or software running thereon. The computing device may include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Although the disclosure refers to a "processor", "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may form a "network" or a "computer network".

Memory may include one or more types of computer-readable storage media including, for example, transactional memory and/or long-term storage memory facilities and may function as file storage, document storage, program storage, and/or as a working memory. The latter may, for example, be in the form of a static random-access memory (SRAM), dynamic random-access memory (DRAM), read-only memory (ROM), cache or flash memory. As long-term memory, memory may, for example, include a volatile or non-volatile computer storage medium, a hard disk drive, a solid-state drive, a magnetic storage medium, a flash memory and/or other storage facility. A hardware memory facility may, for example, store a fixed information set (e.g., software code) including, but not limited to, a file, program, application, source code, object code and the like.

It should be understood that where the claims or specification refer to "a" or "an" element, such reference is not to be construed as there being only one of that element. In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure has been described in terms of certain embodiments and generally associated methods, alterations and permutations of the embodiments and methods will be apparent to those skilled in the art.

What is claimed is:

1. A method for on-the-fly detection of a defective pixel in an image, comprising:
    receiving the image;
    for each analyzed pixel in the image, selecting a shape of an analyzed cell, wherein the analyzed cell consists of a plurality of pixels that are immediately pixel-adjacent in the analyzed cell, wherein a shape of the analyzed cell is selected from the group consisting of a square of pixels, a rectangle of pixels, a cross-shape of pixels, a semicircular line of pixels, or a line of pixels;
    detecting of sharp edge transitions in analyzed cell including performing a gradient analysis of the intensity of linear sets of pixels in various directions in the analyzed cell and when a sharp edge transition is detected, selecting a linear analyzed cell shape that conforms to the sharp edge transition;
    performing statistical distribution analysis for the plurality of pixels in the analyzed cell;
    determining an allowed statistical distance for the analyzed pixel relative to the analyzed cell, wherein the allowed statistical distance is a maximum value between an allowed statistical deviation and a predefined minimum distance; and
    determining that the analyzed pixel is a defective pixel if a computed statistical distance of the analyzed pixel exceeds the allowed statistical distance.

2. The method of claim 1, wherein the computed statistical distance indicates the intensity level of the analyzed pixel in comparison to a statistical center of the intensity levels of the plurality of pixels included in the analyzed cell.

3. The method of claim 1, wherein the statistical distribution analysis includes calculating at least one of a mean value, a median value, or a standard deviation value based on the intensity levels of pixels included in the analyzed cell.

4. The method of claim 1, wherein the selecting an analyzed cell is based on predefined analysis parameters.

5. The method of claim 4, wherein the predefined analysis parameters are one or more parameters from the group consisting of: a shape of the analyzed cell, a size of the analyzed cell, inclusion of the analyzed pixel in the analyzed cell, a result of a directional analysis in the analyzed cell.

6. The method of claim 1, wherein the analyzed cell includes the analyzed pixel.

7. The method of claim 1, wherein the allowed statistical distance is based on statistical calculation parameters.

8. The method of claim 7, wherein the statistical calculation parameters are selected from the group consisting of a type of statistical distribution analysis, a type of mean function, a type of standard deviation, a minimal value for an allowed statistical deviation of the analyzed pixel, and the allowed statistical deviation expressed in a number of SDs from an SD analysis of the analyzed cell, a distance threshold, and one or more predefined multipliers.

9. The method of claim 1, further comprising detecting and removing an outlier pixel in the analyzed cell.

10. A system for on-the-fly detection of a defective pixel in an image, comprising:
    an imaging sensor; and
    a computer system comprising a hardware processor configured to perform a method comprising:

receiving the image from the imaging sensor;

for each analyzed pixel in the image, selecting a shape of an analyzed cell, wherein the analyzed cell consists of a plurality of pixels that are immediately pixel-adjacent in the analyzed cell, wherein a shape of the analyzed cell is selected from the group consisting of a square of pixels, a rectangle of pixels, a cross-shape of pixels, a semicircular line of pixels, or a line of pixels;

detecting of sharp edge transitions in the analyzed cell including performing a gradient analysis of the intensity of linear sets of pixels in various directions in the analyzed cell and when a sharp edge transition is detected, selecting a linear analyzed cell shape that conforms to the sharp edge transition;

performing statistical distribution analysis for the plurality of pixels in the analyzed cell;

determining an allowed statistical distance for the analyzed pixel relative to the analyzed cell, wherein the allowed statistical distance is a maximum value between an allowed statistical deviation and a predefined minimum distance; and determining that the analyzed pixel is a defective pixel if a computed statistical distance of the analyzed pixel exceeds the allowed statistical distance.

11. The system of claim 10, wherein the computed statistical distance indicates the intensity level of the analyzed pixel in comparison to a statistical center of the intensity levels of the plurality of pixels included in the analyzed cell.

12. The system of claim 10, wherein the statistical distribution analysis includes calculating at least one of a mean value, a median value, or a standard deviation value based on the intensity levels of pixels included in the analyzed cell.

13. The system of claim 10, wherein the selecting an analyzed cell is based on predefined analysis parameters.

14. The system of claim 13, wherein the predefined analysis parameters are one or more parameters from the group consisting of: a shape of the analyzed cell, a size of the analyzed cell, inclusion of the analyzed pixel in the analyzed cell, a result of a directional analysis in the analyzed cell.

15. The system of claim 10, wherein the analyzed cell includes the analyzed pixel.

16. The system of claim 10, wherein the allowed statistical distance is based on statistical calculation parameters.

17. The system of claim 16, wherein the statistical calculation parameters are selected from the group consisting of a type of statistical distribution analysis, a type of mean function, a type of standard deviation, a minimal value for an allowed statistical deviation of the analyzed pixel, and the allowed statistical deviation expressed in a number of SDs from an SD analysis of the analyzed cell, a distance threshold, and one or more predefined multipliers.

18. The system of claim 10, wherein the method further comprises detecting and removing an outlier pixel in the analyzed cell.

19. The system of claim 10, wherein the imaging sensor includes a short-wave infrared (SWIR) photodetector array.

* * * * *